United States Patent
Cheng

(10) Patent No.: US 8,367,236 B2
(45) Date of Patent: Feb. 5, 2013

(54) FIXING MECHANISM FOR BATTERY AND ELECTRONIC DEVICE USING THE SAME

(75) Inventor: Da-Qing Cheng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 717 days.

(21) Appl. No.: 12/502,448

(22) Filed: Jul. 14, 2009

(65) Prior Publication Data
US 2010/0285343 A1    Nov. 11, 2010

(30) Foreign Application Priority Data
May 11, 2009   (CN) .......................... 2009 1 0302220

(51) Int. Cl.
*H01M 2/10*   (2006.01)
*H05K 5/00*   (2006.01)
*B65H 1/00*   (2006.01)

(52) U.S. Cl. ..... 429/96; 429/100; 221/282; 361/679.01; 361/679.08

(58) Field of Classification Search ......................... None
See application file for complete search history.

(56) References Cited

U.S. PATENT DOCUMENTS
6,936,375 B2 *   8/2005   Imamura et al. ................ 429/96

* cited by examiner

Primary Examiner — Cynthia Lee
(74) Attorney, Agent, or Firm — Altis Law Group, Inc.

(57) ABSTRACT

A fixing mechanism to fix a battery to a main body of an electronic device includes a channel defined in the main body, the channel comprising two opposite openings at two ends thereof, a first fixing member fixed to one end of the channel, an electrically conductive second fixing member fixed to the other end of the channel, an insulated protector slidably positioned in the channel between the battery and the first fixing member; an electrical conductive member partially received in the insulated protector, and a resilient member. One end of the resilient member is fixed to the first fixing member, and the other end of the resilient member resists the electrical conductive member with the insulated protector toward the battery so that the electrical conductive member is electrically connected to an electrode of the battery.

19 Claims, 6 Drawing Sheets

FIXING MECHANISM FOR BATTERY AND ELECTRONIC DEVICE USING THE SAME

BACKGROUND

1. Technical Field

The present disclosure relates to fixing mechanisms, and particularly, to a fixing mechanism for a battery and an electronic device using the same.

2. Description of the Related Art

An electronic device, such as a wireless keyboard, a wireless touchpad, a remote control, and the like, usually includes a battery to provide electrical power. These electronic devices need a fixing mechanism to position and fix the battery in the electronic devices.

A typical fixing mechanism for mounting the battery inside the electronic device, includes a channel defined in the electronic device, a resilient member, a first fixing member, and a second fixing member. The channel is elongated and columnar in shape. The channel includes two opposite openings at the two ends of the channel. The first fixing member and the second fixing members are correspondingly fixed to the two ends of the channel to seal the two openings, so as to receive the battery in the channel. The second fixing member is electrical conductive. A negative electrode of the battery is in contact with the second fixing member. The resilient member is resisted between a positive electrode of the battery and the first fixing member. However, the resilient member tends to be easily deformed by an external force to contact with an electrically conductive inner surface of the channel. This may cause a short circuit that might shut down the battery, or cause an electrical hazard.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
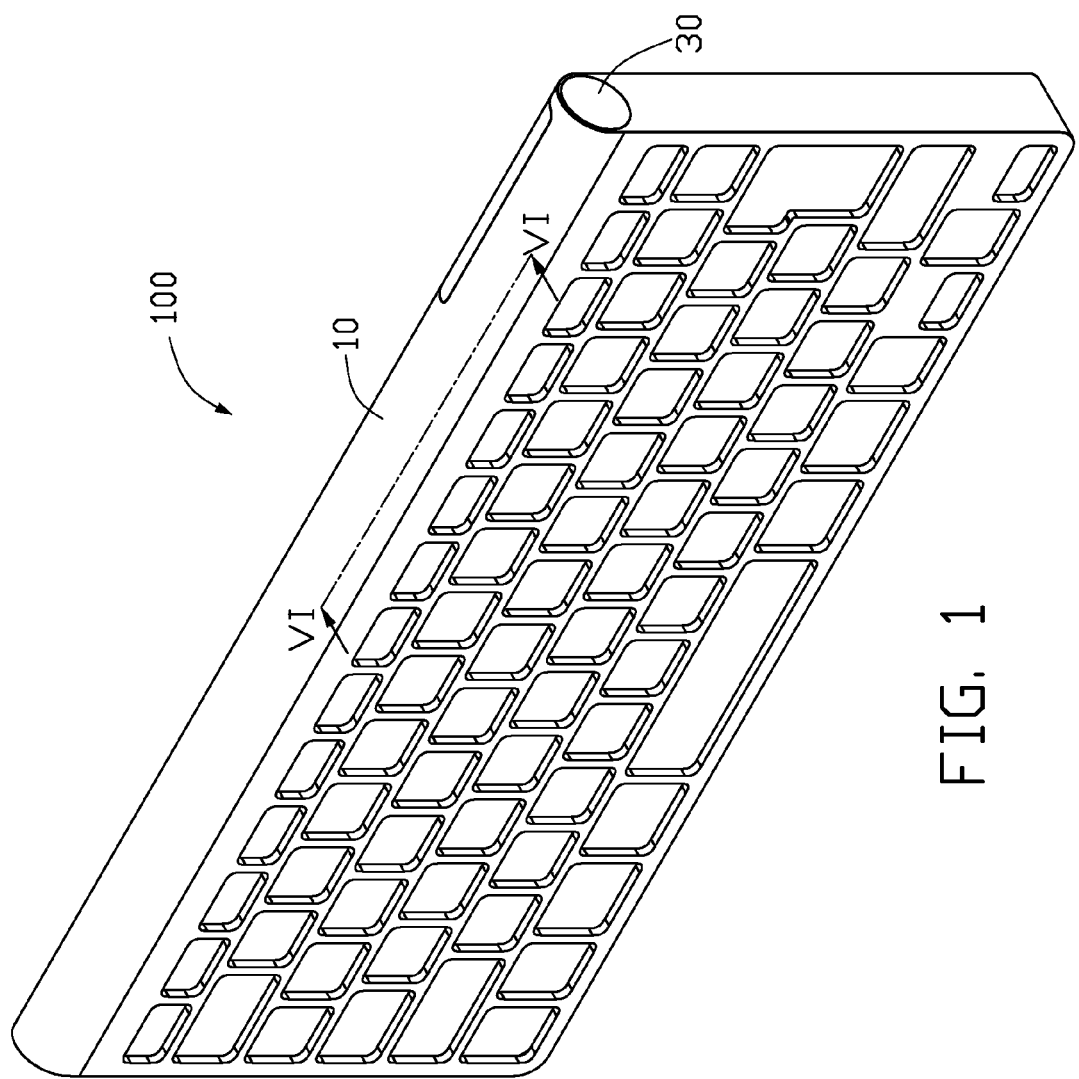
FIG. 1 is an isometric view of an embodiment of an electronic device.
Figure 2:
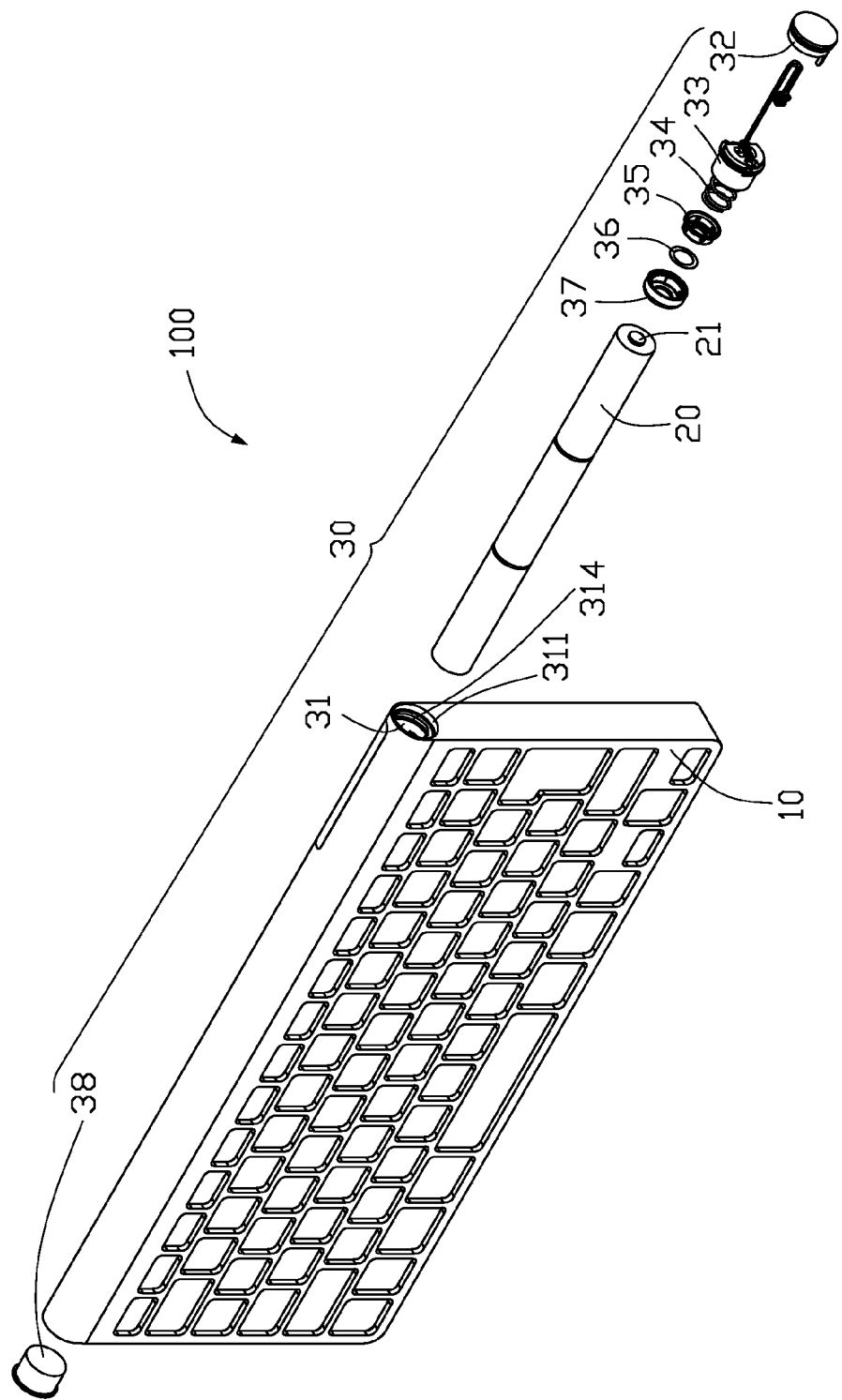
FIG. 2 is an exploded, isometric view of the electronic device of FIG. 1, the electronic device including a fixing mechanism for a battery.
Figure 3:
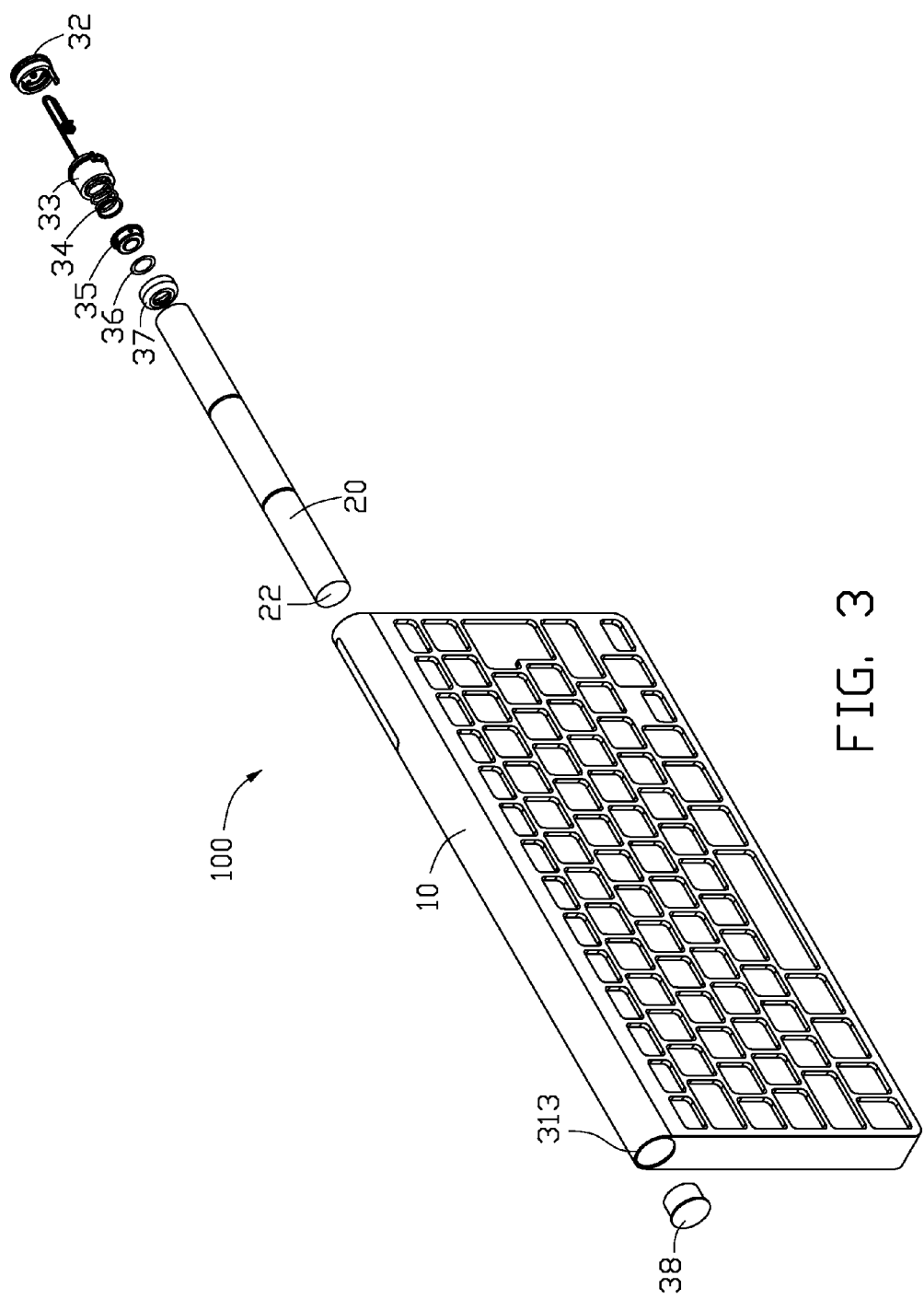
FIG. 3 is similar to FIG. 2, but viewed from another aspect.

Referring to FIGS. 1 through 3, an embodiment of en electronic device 100 includes a main body 10, three batteries 20, and a fixing mechanism 30. The fixing mechanism 30 fixes the three batteries 20 inside the main body 10. The electronic device 100 may be a wireless keyboard, a wireless touchpad, a remote control, and the like. In the illustrated embodiment, the electronic device 100 is a wireless keyboard.

Each of the batteries 20 includes a positive electrode 21 and a negative electrode 22. In the illustrated embodiment, each battery 20 is an AA alkaline battery. The fixing mechanism 30 includes an elongated channel 31, an insulated cover 32, a first fixing member 33, a resilient member 34, an electrical conductive member 35, an insulated protector 37, and a second fixing member 38. The channel 31 is defined in the main body 10. The channel 31 is columnar, and includes a first opening 311 and a second opening 313 in two ends of the channel 31.

The three batteries 20 are disposed in the channel 31. The first fixing member 33, the resilient member 34, the electrical conductive member 35, and the insulated protector 37 are positioned in the channel 31 at a side of the positive electrode 21 of the batteries 20 adjacent to the first opening 311. The second fixing member 38 is fixed to one end of the channel 31 to seal the second opening 313 and contact the negative electrode 22 of the batteries 20. The electrical conductive member 35 and the insulated protector 37 are disposed between the positive electrode 21 of the batteries 20 and the first fixing member 33. The electrical conductive member 35 is disposed in the insulated protector 37 and electrically connected to the positive electrode 21 of the batteries 20. One end of the resilient member 34 is fixed to the first fixing member 33 and the other end of the resilient member 34 resists the electrical conductive member 35 to press the electrical conductive member 35 to electrically connect with the positive electrode 21 of the batteries 20.

Figure 4:
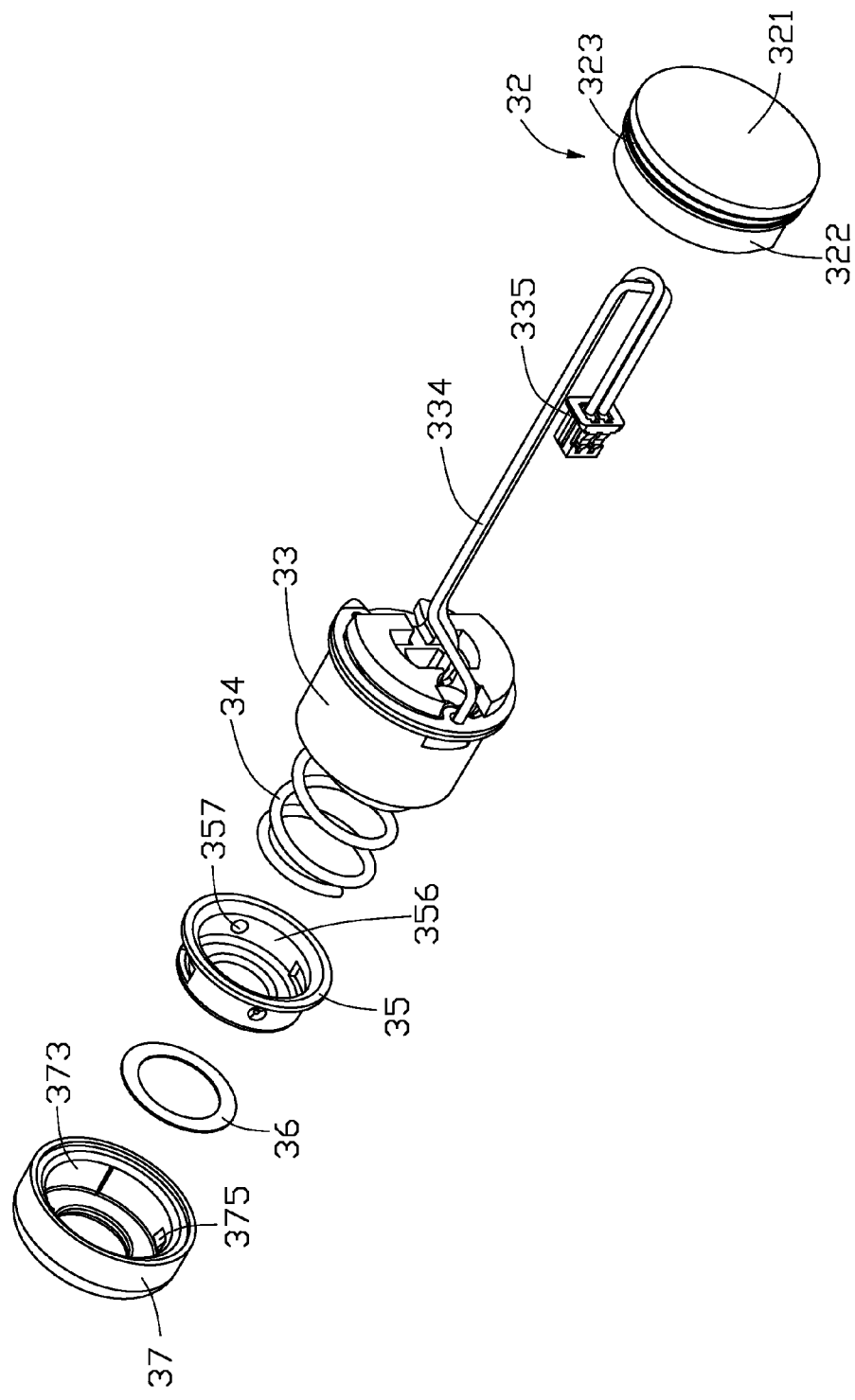
FIG. 4 is an enlarged, isometric view of the fixing mechanism of the electronic device of FIG. 2.
Figure 5:
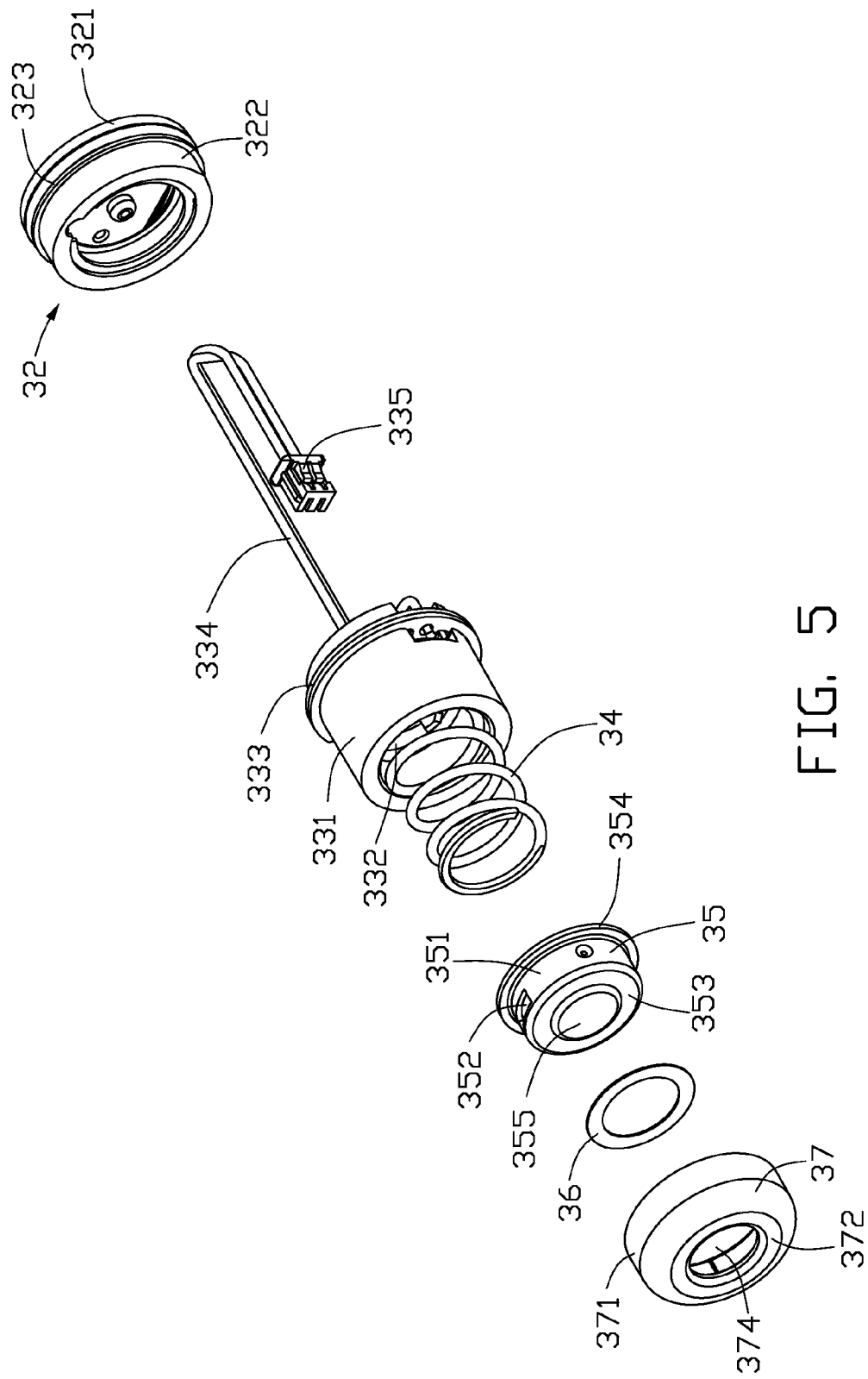
FIG. 5 is similar to FIG. 4, but viewed from another aspect.
Figure 6:
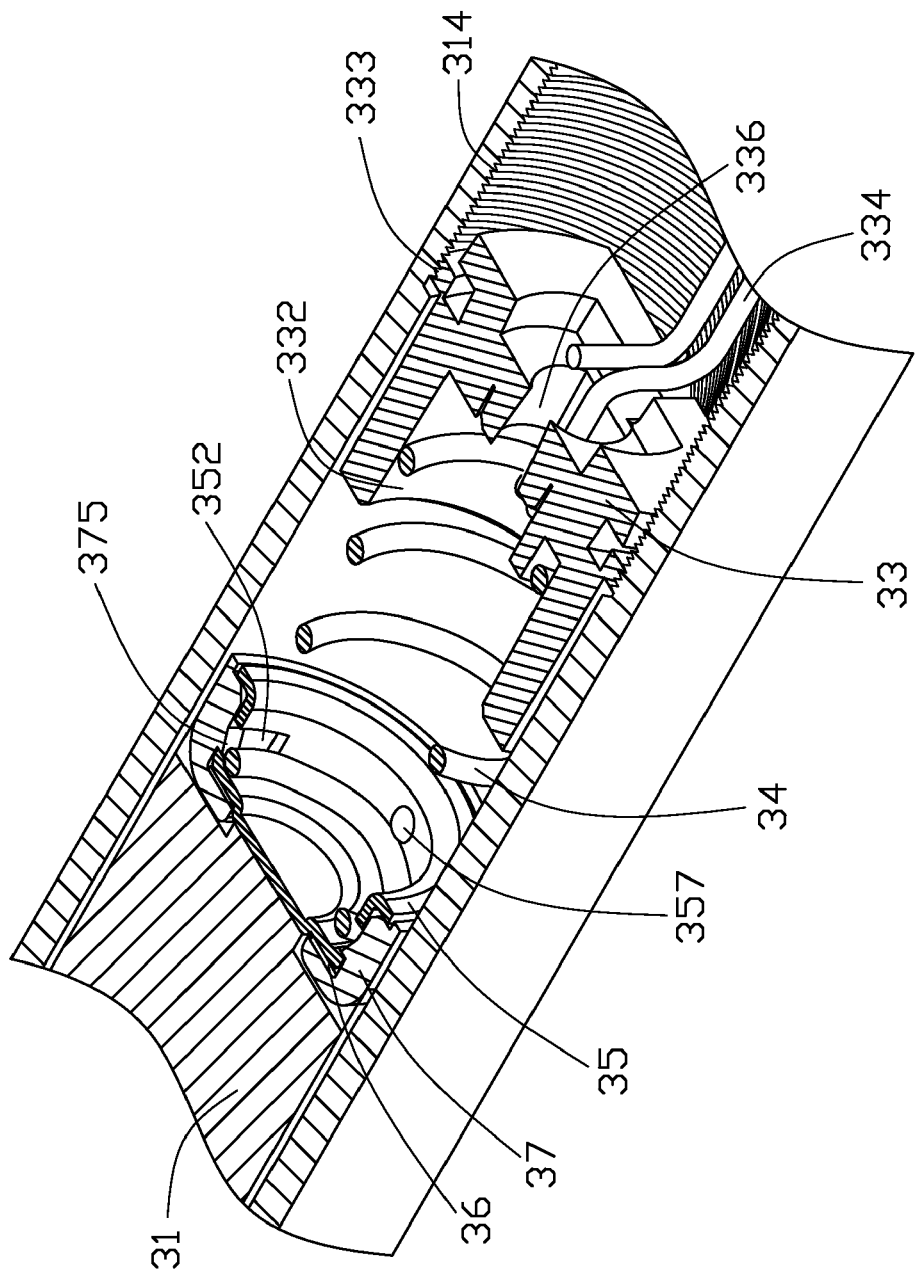
FIG. 6 is a cut away view of FIG. 1 taken along line VI-VI.

Referring to FIGS. 4-6, the first fixing member 33 includes a columnar body 331, a large groove 332 defined at an end of the columnar body 331, and a small groove 336 defined at the other end of the columnar body 331 and communicating with the large groove 332. The first fixing member 33 is made of insulative materials. The large groove 332 is columnar in shape. A diameter of the large groove 332 is larger than a diameter of the small groove 336.

The channel 31 further defines a plurality of inner threads 314 at an inner surface of the other end of the channel 31 adjacent to the first opening 311. The first fixing member 33 further defines a plurality of outer threads 333 at an outer surface of the columnar body 331 corresponding with the inner threads 314 of the channel 31. Thus, the first fixing member 33 is screwed into the channel 31 to fix the batteries 20.

The electrical conductive member 35 may be a cap-shaped structure, which includes a circular base plate 353, a sidewall 351, and a flange 354. The sidewall 351 extends from an edge of the base plate 353. The flange 354 extends from a top of the sidewall 351 and bends outward. The base plate 353 and the sidewall 351 cooperatively form a first receiving space 356 to receive one end of the resilient member 34. The electrical conductive member 35 further includes two latching holes 352, a contacting protrusion 355, and a plurality of latching protrusions 357. The two latching holes 352 are defined in the sidewall 251, and are opposite to each other. The contacting protrusion 355 protrudes out from an outer surface of the base plate 353 to contact with the positive electrode 21 of the batteries 20. The latching protrusions 357 are formed at an inner surface of the sidewall 351 adjacent to the latching holes 352.

The insulated protector 37 includes a base plate 372, and a sidewall 371 extending from an edge of the base plate 372. The base plate 372 defines a through hole 374 according to a shape of the contacting protrusion 355. The insulated protector 37 further includes two latching hooks 375 at an inner surface of the sidewall 371 according to the latching holes 352. The base plate 372 and the sidewall 371 cooperatively define a second receiving space 373 to receive the electrical conductive member 35, except that the contacting protrusion 355 passes through the through hole 374. The latching hooks 375 are engaged into the latching holes 352.

The resilient member 34 is a spring. One end of the resilient member 34 is fixed to an inner surface of the large groove 332 of the first fixing member 33. The other end of the resilient member 34 is mounted with the latching protrusions 357 so as to be fixed to the electrical conductive member 35 in the first receiving space 356. The insulated protector 37 and the electrical conductive member 35 are disposed in the channel 31 between the positive electrode of the batteries 20 and the insulated protector 37. The insulated protector 37 is slidable in the channel 31. The resilient member 34 resists the electrical conductive member 35 to press the electrical conductive member 35 with the insulated protector 37 to slide towards the batteries 20 until the contacting protrusions 355 is electrically connected to the positive electrode 21 of the batteries 20. Thus, the electrical conductive member 35 can be protected by the insulated protector 37 and avoid contact with the inner surface of the channel 31, so that short circuits will not occur.

The insulated cover 32 includes a circular base 321, a sidewall 322 extending from an edge of the base 321, and outer threads 323 defined at an outer surface of the sidewall 322 adjacent to the base 321. The outer threads 323 engage with the inner threads 314 of the channel 31, such that the insulated cover 32 can be screwed into the channel 31 to seal the first opening 311.

The fixing mechanism 30 may further include a lead 334 and a connector 335. The lead 334 is electrically connected to the resilient member 34, and passes through the large groove 332 and the small groove 336. The connector 335 is connected to a distal end of the lead 334 to connect with other electrical components (not shown) in the main body 10.

The fixing mechanism 100 may further include a washer 36. The washer 36 may be a circular ring disposed between the insulated protector 37 and the electrical conductive member 35 around the contacting protrusion 355. In the illustrated embodiment, the washer 36 is a double-sided adhesive tape to create an adhesion between the insulated protector 37 and the electrical conductive member 35. It is to be understood that, in an alternative embodiment, the washer 36 may be omitted.

Referring to FIGS. 2, 3 and 6, the batteries 20 assembled into the electronic device 100 with the fixing mechanism 30 may include the following steps. Firstly, the three batteries 20 are inserted into the channel 31 via the first opening 311 or the second opening 313 in an order so as to place the negative electrode 22 adjacent to the second opening 313. Secondly, the second fixing member 38 is fixed to the end of the channel 31 to seal the second opening 313. Thirdly, the latching hooks 375 of the insulated protector 37 engage with the latching holes 352 of the electrical conductive member 35 so as to fix the electrical conductive member 35 into the insulated protector 37. Fourthly, one end of the resilient member 34 is fixedly connected to the first fixing member 33, and the other end of the resilient member 34 is mounted with the latching protrusions 357 so as to be fixed to the electrical conductive member 35. Fifthly, the insulated protector 37, the electrical conductive member 35, the resilient member 34, and the first fixing member 33 are inserted into the channel 31 via the first opening 311. The first fixing member 33 is fixedly screwed into the channel 31 towards the batteries 20, such that the resilient member 34 resists the electrical conductive member 35 to press the electrical conductive member 35 with the insulated protector 37 to slide towards the batteries 20 until the contacting protrusions 355 is electrically connected to the positive electrode 21 of the batteries 20. Finally, the insulated cover 32 is screwed into the channel 31 to seal the first opening 311.

It should be pointed out that, a number of the batteries 20 can be one, two, or more than three. The latching hooks 375 of the insulated protector 37 may be formed at the outer surface of the sidewall 351 of the electrical conductive member 35. Correspondingly, the insulated protector 37 defines a plurality of latching depressions at the inner surface of the sidewall 371 to hold the latching hooks 375 of the electrical conductive member 35.

It is to be understood that, in an alternative embodiment, the electrical conductive member 35 is electrically connected to the negative electrode 22 of the batteries 20, and the second fixing member 38 is electrically connected to the positive electrode 21 of the batteries 20.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A fixing mechanism for fixing a battery to an electronic device comprising a main body, the fixing mechanism comprising:
   a channel defined in the main body of the electronic device, the channel comprising two opposite openings at two ends thereof;
   a first fixing member fixed to one end of the channel adjacent to one of the openings;
   a second fixing member fixed to the other end of the channel to seal the other one of the openings, the second fixing member being electrically conductive;
   an insulated protector slidably positioned in the channel between the battery and the first fixing member;
   an electrically conductive member partially received in the insulated protector; and
   a resilient member, wherein one end of the resilient member is fixed to the first fixing member, and the other end of the resilient member resists the electrical conductive member with the insulated protector toward the battery so that the electrical conductive member is electrically connected to an electrode of the battery, the first fixing member comprises a columnar body, a large groove defined at an end of the columnar body, and a small groove defined at the other end of the columnar body and communicating with the large groove; one end of the resilient member is fixed to an inner surface of the large groove of the first fixing member.

2. The fixing mechanism of claim 1, wherein the insulated protector comprises a base plate defining a through hole therein, and a sidewall extending from an edge of the base plate, the base plate and the sidewall cooperatively defining a receiving space to receive the electrical conductive member.

3. The fixing mechanism of claim 2, wherein the electrical conductive member comprises a base plate, a sidewall extending from an edge of the base plate, a flange extending from a top of the sidewall and bent outward, and a contacting protrusion protruding out from an outer surface of the base plate; the contacting protrusion passes through the through hole of the insulated protector and contacts the electrode of the battery.

4. The fixing mechanism of claim 3, wherein the electrical conductive member further comprises at least one latching hole defined in the sidewall thereof; the insulated protector further comprises at least one latching hook formed at an inner surface of the sidewall corresponding to the at least one latching hole, the at least one latching hook engages with the at least one latching hole, such that the electrical conductive member is fixedly received in the insulated protector.

5. The fixing mechanism of claim 3, wherein the electrical conductive member further comprises a plurality of latching protrusions formed at an inner surface of the sidewall; one end of the resilient member is mounted with the latching protrusions so as to be fixed to the electrical conductive member.

6. The fixing mechanism of claim 1, wherein the channel further defines a plurality of inner threads at an inner surface of one end of the channel adjacent to the first opening; the first fixing member further defines a plurality of outer threads at an outer surface of the columnar body corresponding with the inner threads of the channel, such that the first fixing member is screwed into the channel.

7. The fixing mechanism of claim 3, further comprising a washer, the washer being a circular ring disposed between the insulated protector and the electrical conductive member around the contacting protrusion.

8. The fixing mechanism of claim 7, wherein the washer is a double-sided adhesive tape.

9. The fixing mechanism of claim 1, further comprising a lead electrically connected to the resilient member and passing through the first fixing member, and a connector connected to a distal end of the lead.

10. An electronic device, comprising:
a battery;
a main body; and
a fixing mechanism for fixing the battery to the main body, the fixing mechanism comprising a channel defined in the main body, the channel comprising two opposite openings at two ends thereof, a first fixing member fixed to one end of the channel adjacent to one of the openings, an electrically conductive second fixing member fixed to the other end of the channel to seal the other one of the openings, an insulated protector slidably positioned in the channel between the battery and the first fixing member, an electrically conductive member partially received in the insulated protector, and a resilient member, wherein one end of the resilient member is fixed to the first fixing member, and the other end of the resilient member resists the electrical conductive member with the insulated protector toward the battery so that the electrical conductive member is electrically connected to an electrode of the battery, the first fixing member comprises a columnar body, a large groove defined at an end of the columnar body, and a small groove defined at the other end of the columnar body and communicating with the large groove; one end of the resilient member is fixed to an inner surface of the large groove of the first fixing member.

11. The electronic device of claim 9, wherein the insulated protector comprises a base plate defining a through hole therein, and a sidewall extending from an edge of the base plate, the base plate and the sidewall cooperatively defining a receiving space to receive the electrical conductive member.

12. The electronic device of claim 11, wherein the electrical conductive member comprises a base plate, a sidewall extending from an edge of the base plate, a flange extending from a top of the sidewall and bent outward, and a contacting protrusion protruding out from an outer surface of the base plate; the contacting protrusion passes through the through hole of the insulated protector and contacts the electrode of the battery.

13. The electronic device of claim 12, wherein the electrical conductive member further comprises at least one latching hole defined in the sidewall thereof; the insulated protector further comprises at least one latching hook formed at an inner surface of the sidewall corresponding to the at least one latching hole, the at least one latching hook engages with the at least one latching hole, such that the electrical conductive member is fixedly received in the insulated protector.

14. The electronic device of claim 12, wherein the electrical conductive member further comprises a plurality of latching protrusions formed at an inner surface of the sidewall; one end of the resilient member is mounted with the latching protrusions so as to be fixed to the electrical conductive member.

15. The electronic device of claim 10, wherein the channel further defines a plurality of inner threads at an inner surface of one end of the channel adjacent to the first opening; the first fixing member further defines a plurality of outer threads at an outer surface of the columnar body corresponding with the inner threads of the channel, such that the first fixing member is screwed into the channel.

16. The electronic device of claim 12, wherein the fixing mechanism further comprises a washer, the washer being a circular ring disposed between the insulated protector and the electrical conductive member around the contacting protrusion.

17. The electronic device of claim 16, wherein the washer is a double-sided adhesive tape.

18. The electronic device of claim 10, wherein the fixing mechanism further comprises a lead electrically connected to the resilient member and passing through the first fixing member, and a connector connected to a distal end of the lead.

19. An electronic device, comprising:
a battery;
a main body; and
a fixing mechanism for fixing the battery to the main body, the fixing mechanism comprising a channel defined in the main body, the channel comprising two opposite openings at two ends thereof, a first fixing member fixed to one end of the channel adjacent to one of the openings, an electrically conductive second fixing member fixed to the other end of the channel to seal the other one of the openings, an insulated protector slidably positioned in the channel between the battery and the first fixing member, an electrically conductive member partially received in the insulated protector, and a resilient member, wherein one end of the resilient member is fixed to the first fixing member, and the other end of the resilient member resists the electrical conductive member with the insulated protector toward the battery so that the electrical conductive member is electrically connected to an electrode of the battery;
wherein the insulated protector comprises a base plate defining a through hole therein, and a sidewall extending from an edge of the base plate, the base plate and the sidewall cooperatively defining a receiving space to receive the electrical conductive member; and
wherein the electrical conductive member comprises a base plate, a sidewall extending from an edge of the base plate, a flange extending from a top of the sidewall and bent outward, and a contacting protrusion protruding out from an outer surface of the base plate; the contacting protrusion passes through the through hole of the insulated protector and contacts the electrode of the battery.

* * * * *